(12) United States Patent
Ormsby et al.

(10) Patent No.: US 9,939,003 B2
(45) Date of Patent: Apr. 10, 2018

(54) CLIP

(71) Applicant: NIFCO AMERICA CORP., Canal Winchester, OH (US)

(72) Inventors: Daniel Ormsby, Lebanon, OH (US); Kevin Flaute, Canal Winchester, OH (US)

(73) Assignee: NIFCO AMERICA CORP., Canal Winchester, OH (US)

( * ) Notice: Subject to any disclaimer, the term of this patent is extended or adjusted under 35 U.S.C. 154(b) by 252 days.

(21) Appl. No.: 14/750,520

(22) Filed: Jun. 25, 2015

(65) Prior Publication Data
US 2016/0377102 A1 Dec. 29, 2016

(51) Int. Cl.
*F16B 19/00* (2006.01)
*F16B 21/08* (2006.01)
*F16B 5/06* (2006.01)

(52) U.S. Cl.
CPC .......... *F16B 21/086* (2013.01); *F16B 5/0657* (2013.01)

(58) Field of Classification Search
CPC .... F16B 21/086; F16B 5/0657; Y10T 24/309; Y10T 24/44026; B60R 13/0206
See application file for complete search history.

(56) References Cited

U.S. PATENT DOCUMENTS

| 2,909,957 | A | * | 10/1959 | Rapata | F16B 13/02 24/453 |
| 5,592,719 | A | * | 1/1997 | Eto | F16B 21/086 24/297 |
| 5,704,753 | A | * | 1/1998 | Ueno | F16B 21/086 24/297 |
| 6,289,560 | B1 | * | 9/2001 | Guyot | F16B 5/065 24/297 |

(Continued)

FOREIGN PATENT DOCUMENTS

| JP | 2009-293798 A | 12/2009 |
| JP | 2014-029192 A | 2/2014 |

OTHER PUBLICATIONS

PCT/ISA/220, "Notification of Transmittal of the International Search Report and the Written Opinion of the International Searching Authority, or the Declaration for International Application No. PCT/US16/37794," dated Sep. 19, 2016.

(Continued)

*Primary Examiner* — Jason W San
(74) *Attorney, Agent, or Firm* — Manabu Kanesaka

(57) ABSTRACT

A clip adapted to be connected to a connected member with a hole includes a base, an engaging section extending from the base, and an insertion section fixed to the engaging section at a side opposite to the base and adapted to be inserted into the hole of the connected member. The engaging section includes an engaging leg extending from the base, and having a first enlarged portion adapted to engage (Continued)

the hole of the connected member, and a beam formed near the insertion section to extend inwardly toward the center axis and connected to the insertion section, and a pair of engaging members extending from the base along the engaging leg and disposed perpendicular to the engaging leg so that the engaging leg is disposed between the pair of engaging members along a circumferential direction of the engaging section.

8 Claims, 6 Drawing Sheets

(56) References Cited

U.S. PATENT DOCUMENTS

| | | | | |
|---|---|---|---|---|
| 6,575,681 | B2* | 6/2003 | Kojima | F16B 21/086 24/297 |
| 7,178,206 | B2* | 2/2007 | Kuhnle | B60R 13/0206 24/297 |
| 7,222,398 | B2* | 5/2007 | Koike | B62D 27/02 24/297 |
| 7,243,401 | B2* | 7/2007 | Sawatani | F16B 21/06 24/297 |
| 7,306,419 | B2* | 12/2007 | Lepper | F16B 21/086 411/453 |
| 7,444,721 | B2* | 11/2008 | Smith | F16B 5/0657 24/297 |
| 7,549,829 | B2* | 6/2009 | Okada | F16B 5/065 24/453 |
| 7,549,830 | B2* | 6/2009 | Cooley | F16B 21/086 24/297 |
| 8,333,540 | B2* | 12/2012 | Nakazato | F16B 21/086 24/297 |
| 8,393,058 | B2* | 3/2013 | Okada | B60R 13/0206 24/297 |
| D701,450 | S* | 3/2014 | Ukai | D8/382 |
| 8,671,527 | B2* | 3/2014 | Scroggie | F16B 5/0642 24/297 |
| 8,757,951 | B2* | 6/2014 | Rosemann | B60R 13/0206 411/508 |
| 8,806,722 | B2* | 8/2014 | Iwahara | F16B 21/086 24/297 |
| 9,145,909 | B2* | 9/2015 | Lepper | F16B 5/0657 |
| 2002/0028123 | A1* | 3/2002 | Miura | F16B 19/004 411/508 |
| 2004/0052612 | A1* | 3/2004 | Miura | F16B 19/004 411/508 |
| 2004/0181917 | A1* | 9/2004 | Sawatani | F16B 21/06 24/297 |
| 2005/0155191 | A1* | 7/2005 | Asano | B60R 13/0206 24/297 |
| 2006/0207068 | A1* | 9/2006 | Lepper | F16B 21/086 24/297 |
| 2006/0239772 | A1* | 10/2006 | Kuroda | F16B 5/065 403/329 |
| 2008/0298890 | A1* | 12/2008 | Koike | F16B 5/0628 403/408.1 |
| 2009/0188086 | A1* | 7/2009 | Okada | B60R 13/0206 24/297 |
| 2009/0218464 | A1* | 9/2009 | Kato | B60R 13/0206 248/316.7 |
| 2010/0293761 | A1* | 11/2010 | Koike | F16B 21/086 24/458 |
| 2013/0011188 | A1 | 1/2013 | Donnelly | |
| 2013/0129450 | A1* | 5/2013 | Aoki | B29C 45/44 411/509 |
| 2014/0117032 | A1* | 5/2014 | Tazioli | B65D 59/02 220/796 |
| 2015/0128386 | A1* | 5/2015 | Lepper | F16B 5/0657 24/458 |
| 2015/0135484 | A1* | 5/2015 | Leverger | F16B 21/086 24/292 |

OTHER PUBLICATIONS

PCT/ISA/237, "Written Opinion of the International Searching Authority for International Application No. PCT/US16/37794," dated Sep. 19, 2016.

\* cited by examiner

CLIP

FIELD OF THE INVENTION

The present invention relates to an improvement of a clip clipping on an object to be clipped by pushing an insertion section thereof into a mounting hole provided in the object to be clipped.

BACKGROUND OF THE INVENTION

Conventionally, there is a well known clip including a head part, and an engagement part extending from the base part and having a plurality of elastic engagement legs arranged in a circumferential direction at predetermined intervals (for example, see Japanese Patent Publication No. 2009-293798).

PROBLEMS TO BE SOLVED BY THE INVENTION

The conventional clip is capable of suppressing inserting force (pressing force) by providing an air gap between the head part and the elastic engagement legs, and could prevent damage of the connecting portion between a support column and the head portion.

However, in the conventional clip, each of the plurality of elastic engagement legs further includes an elastic leg and an enlarged portion arranged on an outer periphery in the middle of the axial direction. Although the conventional clip is capable of being inserted into the hole provided in the object to be clipped with low inserting force, due to the structure of the elastic engagement legs, a complex sliding core mold is required for manufacturing and a high impact grade material such as polyoxymethylene ("POM"), which is also known as acetal, polyacetal, and polyformaldehyde, is required for producing the conventional clip. Thus, the manufacturing cost is high.

Therefore, the present invention is made in view of the aforementioned problems that a conventional technology has, and an object of the present invention is to provide a clip having a simplified design that can be manufactured without a complicated sliding core mold, so that the output is higher for similar tonnage mold as currently used and the tooling costs are reduced.

Further, the leg design is improved to reduce stress during the removal. The outside legs are "flap" style, and the center leg has a relief shape that reduces stress, allowing for general POM material to be used for manufacturing; thus, using high impact material is not necessary, and the material cost is reduced.

Further objects and advantages of the invention will be apparent from the following description of the invention.

MEANS FOR SOLVING THE PROBLEMS

In order to obtain the aforementioned object, in the present invention, a clip adapted to be connected to a connected member with a hole, comprises a base, an engaging section extending from the base, and an insertion section fixed to the engaging section at a side opposite to the base and adapted to be inserted into the hole of the connected member. The engaging section comprises an engaging leg extending from the base, and having elasticity to move inwardly toward a center axis of the engaging section, said engaging leg having a first enlarged portion adapted to engage the hole of the connected member, and a beam formed near the insertion section to extend inwardly toward the center axis and connected to the insertion section. The engaging section also comprises a pair of engaging members extending from the base along the engaging leg and disposed perpendicular to the engaging leg so that the engaging leg is disposed between the pair of engaging members along a circumferential direction of the engaging section.

According to such configuration, when the clip of the present invention is inserted into the hole of the connected member, the engaging leg and the pair of engaging members are pressed against the sidewall of the hole and deform inwardly towards the center axis of the clip. The beam simultaneously deforms in which one end of the beam on the side connected to the insertion section deforms away from the inserting direction of the clip and the other end of the beam on the side connected to the engaging leg deforms towards the inserting direction of the clip. Such configuration allows the beam to deform and allows low force for inserting the clip into the hole.

Another aspect of the present invention is that the engaging section includes an inner space surrounded by the pair of engaging members and engaging leg.

According to such configuration, the inner space of the clip reduces the complexity of the tooling and provides space for the beam to deform during the insertion of the clip into the connected member thereby reducing the stress applied to the engaging leg.

Another aspect of the present invention is that the insertion section includes a projection projecting toward the base and fixed to the beam.

According to such configuration, the projection deforms concurrently with the beam during the insertion of the clip into the connected member thereby reducing the stress applied to the engaging leg.

Another aspect of the present invention is that the beam has a linear shape extending substantially perpendicular to an insertion direction of the clip.

Another aspect of the present invention is that a connecting portion between the base and the engaging leg is located on a plane different from a connecting portion between the engaging leg and the projection.

Another aspect of the present invention is that each pair of engaging members includes an inner portion and an outer portion extending circumferentially of the engaging section from one end of the inner portion to form a space therebetween, said outer portion having a second enlarged portion protruding outwardly therefrom.

Another aspect of the present invention is that the pair of engaging members is arranged such that each of the inner portions faces each other to have an inner space therebetween.

Another aspect of the present invention is that the beam has a thickness less than that of the first enlarged portion.

EFFECT OF THE INVENTION

According to the aforementioned structures, a clip having a simplified design can be manufactured without a sliding core mold, and the leg design is improved to reduce stress during the removal. The outside legs are "flap" style, and the center leg has a relief shape that reduces stress, allowing for general POM material to be used for manufacturing; thus, using high impact material is not necessary, and the material cost is reduced.

The heretofore described and other objects, features, and advantages of the invention will be clarified by the following description relating to the attached drawings illustrating preferred embodiments as examples of the invention.

DETAILED DESCRIPTION OF THE EMBODIMENTS

Figure 1:
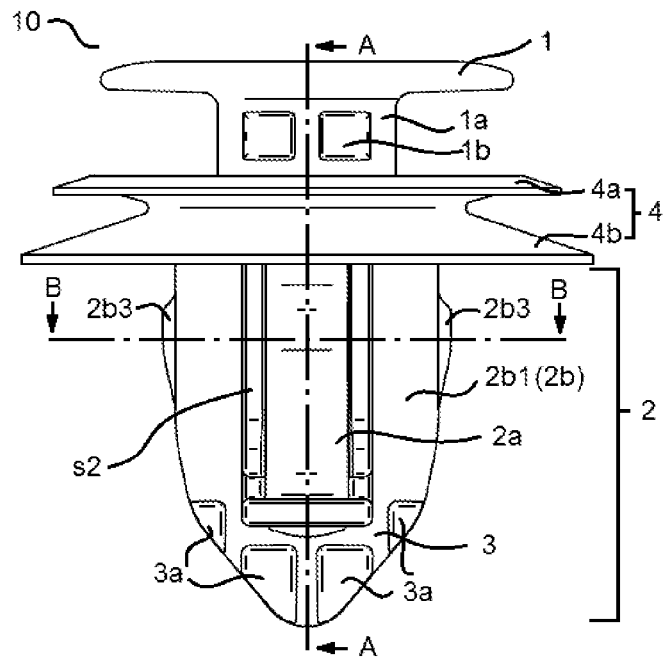
FIG. 1 is a front view of a clip of the present invention.

Hereinafter, an embodiment for carrying out the invention is explained based on FIGS. 1-9(b).

The clip 10 according to the preferred embodiment of the present invention includes a base 1, a flange 4, an engaging section 2 extending from the base 1, and an insertion section 3, see FIGS. 1-4.

The base 1 forming a disc-like shape has a neck portion 1a, which is formed below the base 1. The neck portion 1a has a diameter smaller than that of the base 1. In the depicted example, four concave portions 1b are formed on a circumferential surface of the neck portion 1a.

Below the neck portion 1a, the flange 4 is formed. The flange 4 includes an upper flange portion 4a and a lower flange portion 4b. The upper flange portion 4a is formed and connected to the neck portion 1a. The lower flange portion 4b is formed below the upper flange portion 4a, which is a side opposite to the neck portion 1a, see FIGS. 1 and 5. Each of the upper and lower flange portions 4a, 4b have a diameter gradually increasing from a side with the base 1 toward a side with the insertion section 3, and the diameter of the flange 4 reduces at a portion between the upper flange portion 4a and the lower flange portion 4b. The maximum diameter of the upper flange portion 4a is less than that of the lower flange portion 4b.

Through the aforementioned structure, the clip 10 is capable of mounting a panel or another object to be mounted cm1 between the base 1 and the upper flange portion 4a. The neck 1a enters a hook slot or a keyhole h1 of a panel or another object cm1 to be mounted by moving the clip 10 or causing a relative movement of the clip 10 to a direction perpendicular to the axis of the clip 10. The hook slot or the keyhole h1 has a width less than the diameter of the base 1; thus, the panel or another object to be mounted cm1 is sandwiched between the base 1 and the upper flange portion 4a, see FIG. 9(a).

Next, the engaging section 2 is formed below the lower flange portion 4b. The engaging section 2 includes an engaging leg 2a and a pair of engaging members 2b. A first space s1 is surrounded by the pair of engaging members 2b and the engaging leg 2a, see FIGS. 1-4 and 8(a).

Figure 7A:
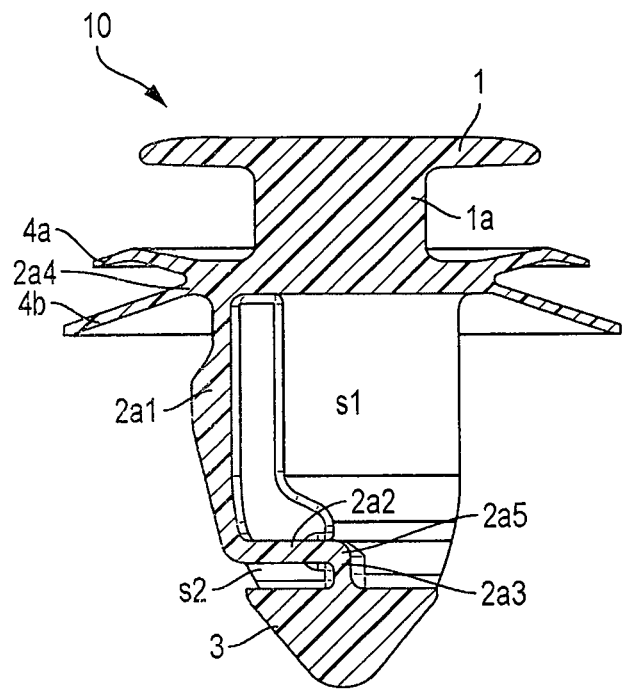
FIG. 7(a) is a cross-sectional view thereof taken along the line A-A of FIG. 1 in an initial state.

The engaging leg 2a extends from the base 1, and has an elasticity to move inwardly toward a center axis of the engaging section 2, see FIG. 7(a). The engaging leg 2a is formed between the pair of engaging members 2b, and is formed with a second space s2 on sides other than the side connected to the base 1, see FIG. 1. The engaging leg 2a has an elongated shape and includes a first enlarged portion 2a1 at a side surface, and a beam 2a2 extending inwardly from a lower end thereof.

The first enlarged portion 2a1 is adapted to engage a mounting hole h2 of the connected member cm2. The engaged leg 2a gradually protrudes outwardly from the insertion section 3 towards the first enlarged portion 2a1 and gradually reduces the protrusion from the first enlarged portion 2a1 toward the base 1.

The beam 2a2 is formed near the insertion section 3 to extend inwardly toward the center axis of the clip 10 and connected to the insertion section 3 through a projection 2a3, see FIG. 7(a). The beam 2a2 has a linear shape extending substantially perpendicular to an insertion direction of the clip 10, and a thickness less than that of the first enlarged portion 2a1.

The pair of engaging members 2b extends from the base 1 along the engaging leg 2a and is disposed perpendicular to the engaging leg 2a so that the engaging leg 2a is disposed between the pair of engaging members 2b along a circumferential direction of the engaging section 2. Each pair of engaging members 2b includes an inner portion 2b2, an outer portion 2b1, and a second enlarged portion 2b3.

Figure 2:
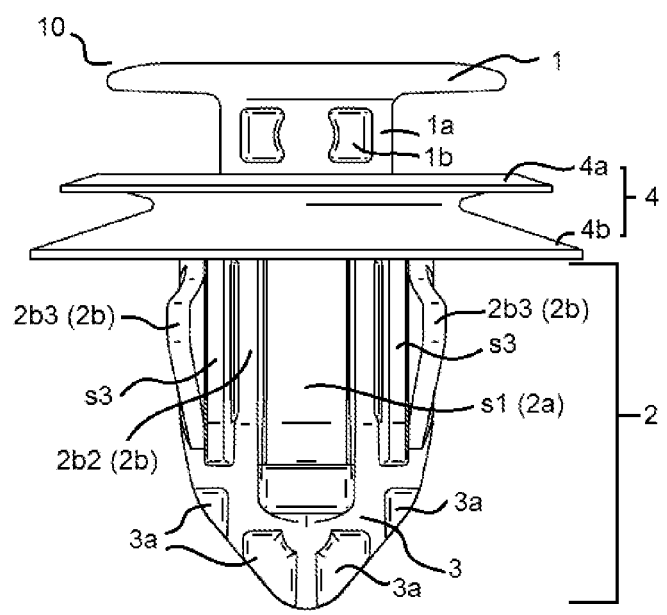
FIG. 2 is a rear view thereof.

The pair of inner portions 2b2 is formed in parallel vertically from the lower flange portion 4b towards the insertion section 3 and is connected to the pair of outer portions 2b2, respectively, see FIG. 2. In other words, one side of the inner portion 2b2 is connected to one side of the outer portion 2b2 with the space S3 therebetween. Also, the pair of inner portions 2b2 and the pair of outer portions 2b1 are connected at the lower flange portion 4b and at the insertion section 3. Each of the pair of inner portions 2b2 faces each other to form the first space s1 therebetween, see FIG. 8(a).

Figure 8A:
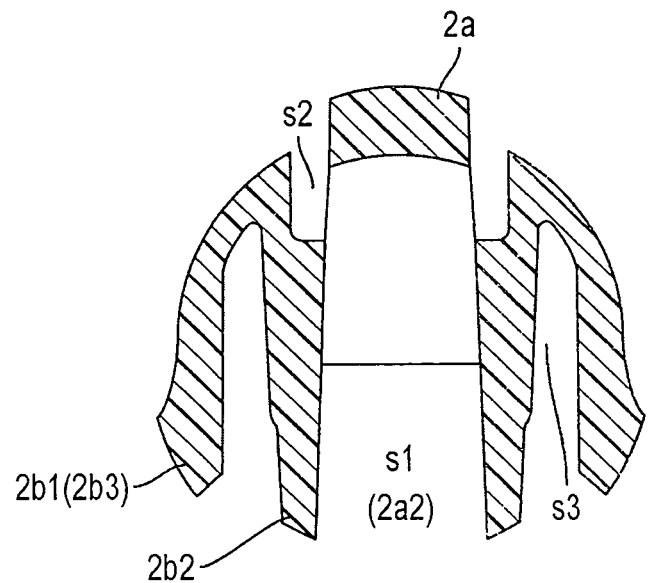
FIG. 8(a) is a cross-sectional view thereof along the line B-B of FIG. 1 in an initial state.

The first space s1 extends from the opening formed between the pair of inner portions 2b2 on a side opposite to the engaging leg 2a towards the second space s2 formed adjacent to the engaging leg 2a as illustrated in FIG. 8(a). In FIG. 2, a rear surface of the engaging leg 2a is viewed through the opening of the first space s1.

Each of the outer portions 2b1 extends circumferentially of the engaging section 2 from one end of the inner portion 2b2 to form the third space s3 therebetween. The one end of the outer portions 2b1 is connected to the inner portion 2b2 at a side opposite to a side having an opening to the third space s3, see FIG. 8(a). Further, as mentioned previously, the outer portions 2b1 are connected at the lower flange portion 4b and the insertion portion 3, see FIGS. 2 and 3.

The third space s3 is formed so that when the clip 10 is inserted into the mounting hole h2 of the connected member cm2, the outer portions 2b1 deform inwardly to pass through hole h2 of the connected member cm2.

Figure 3:
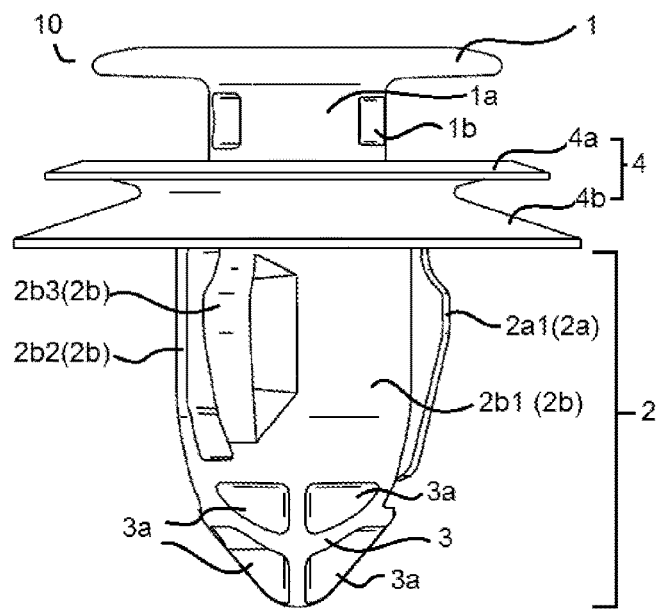
FIG. 3 is a left-side view thereof.
Figure 4:
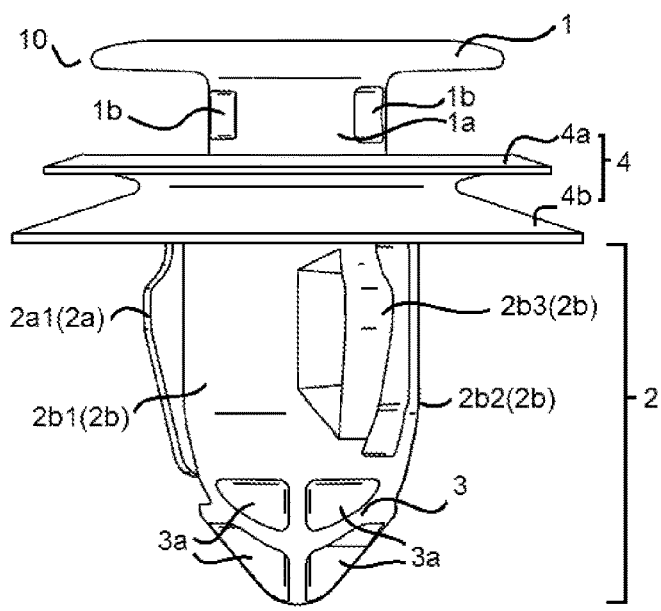
FIG. 4 is a right-side view thereof.
Figure 5:
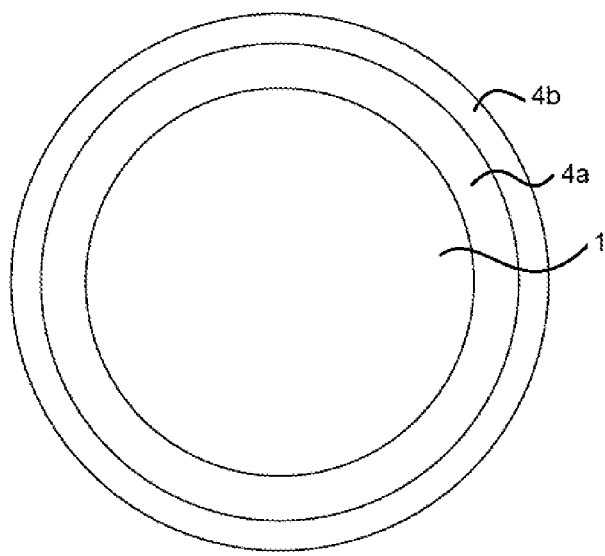
FIG. 5 is a plan view thereof.

The second enlarged portion 2b3 protrudes outwardly from the outer portion 2b1 to engage the mounting hole h2 of the connected member cm2, see FIGS. 1 and 8(a). As shown in FIGS. 3 and 4, the second enlarged portion 2b3 of each of the pair of engaging members 2b and the first enlarged portion 2a1 of the engaging leg 2a are arranged at the same or substantially the same distance from one end of the clip 10. Therefore, the circumference of the clip 10 gradually increases from the insertion section 3 towards the first enlarged portion 2a1 and the second enlarged portions 2b3. The circumference of the clip 10 at the first enlarged portion 2a1 and the second enlarged portion 2b3 is the greatest of the engaging section 2. Then, the circumference of the clip 10 gradually decreases from the first enlarged portion 2a1 and the second enlarged portion 2b3 toward the base 1 so that the connected member cm2 is sandwiched between the first and second enlarged portions 2a1, 2b3 and the lower flange portion 4b.

Finally, the insertion section 3 is configured to be inserted into the mounting hole h2 provided in the connected member cm2. Thus, the insertion section 3 has a diameter smaller than that of the hole h2 of the connected member cm2. The insertion section 3 is fixed to the engaging section 2 at a side opposite to the base 1 by the projection 2a3 projecting toward the base 1 and fixed to the beam 2a2 of the engaging leg 2a. A connecting portion 2a4 between the base 1 and the engaging leg 2a is located on a plane different from a connecting portion 2a5 between the engaging leg 2a and the projection 2a3.

Figure 6:
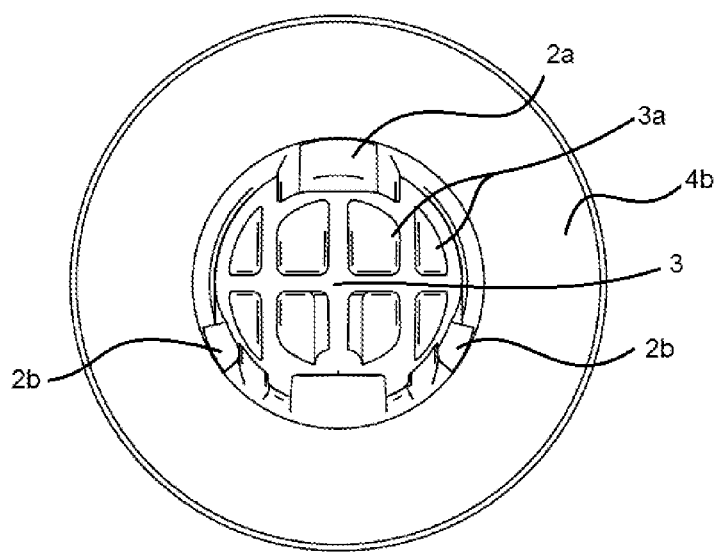
FIG. 6 is a bottom view thereof.

The insertion section 3 is formed with grooves 3a to reduce the amount of resin to be used. In the depicted example, grooves are formed at an end section of the insertion section 3 so that the end section of the insertion section 3 has a "plus" shape from the bottom view as illustrated in FIG. 6.

From the aforementioned structure, when the clip is inserted into the hole h2 of the connected member cm2, the insertion section 3 is first inserted, and the beam 2a2 deforms in which one end of the beam 2a2 on the side connected to the projection 2a3 deforms away from the inserting direction of the clip and the other end of the beam 2a2 on the side connected to the engaging leg 2a deforms towards the inserting direction of the clip.

Figure 7B:
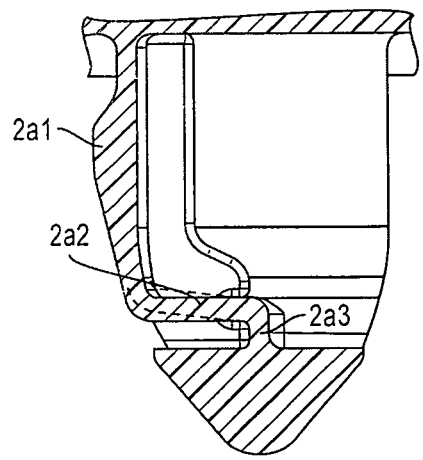
FIG. 7(b) is a cross-sectional view similar to FIG. 1 in a state in which the beam is deformed during the insertion of the clip.
Figure 8B:
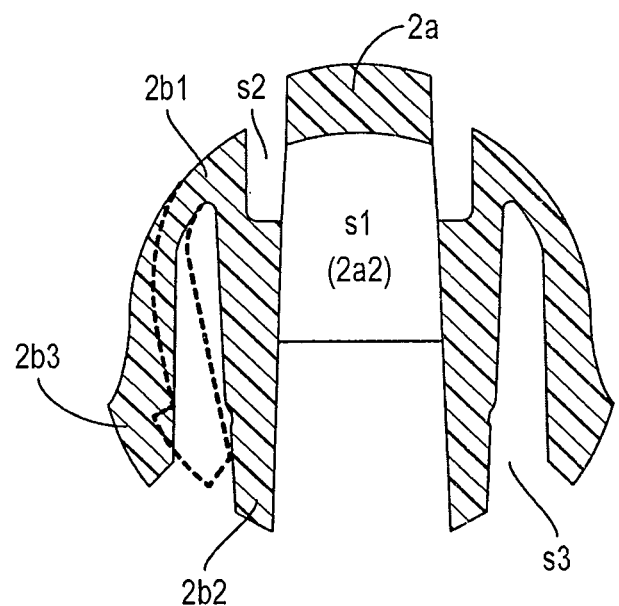
FIG. 8(b) is a cross-sectional view thereof similar to FIG. 1 in a state in which the engaging leg is deformed during the insertion of the clip.

After the insertion section 3 passes through the hole h2, the engaging leg 2a is pressed against the sidewall of the hole h2 of the connected member cm2. As shown in FIG. 7(b), the engaging leg 2a deforms inwardly towards the center axis of the clip 10. The outer portions 2b1 of the pair of engaging members 2b are also simultaneously pressed against the sidewall of the hole h2 of the connected member cm2. The broken line in FIG. 8(b) depicts the deformation of the outer portions 2b1 of the engaging members 2b. One end of each of the pair of outer portions 2b1 on the side having the second enlarged portion 2b3 deforms inwardly toward the center axis of the clip and abuts the inner portion 2b2.

Figure 9A:
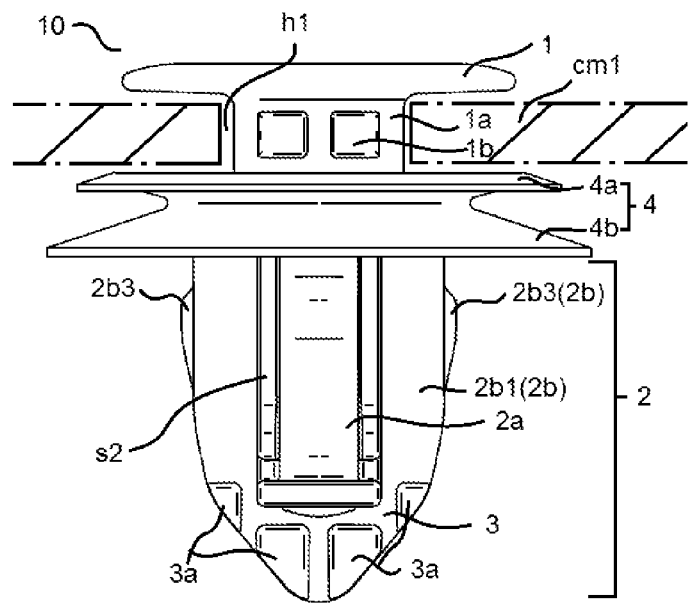
FIG. 9(a) shows a clip of the present invention connecting to a connected member.
Figure 9B:
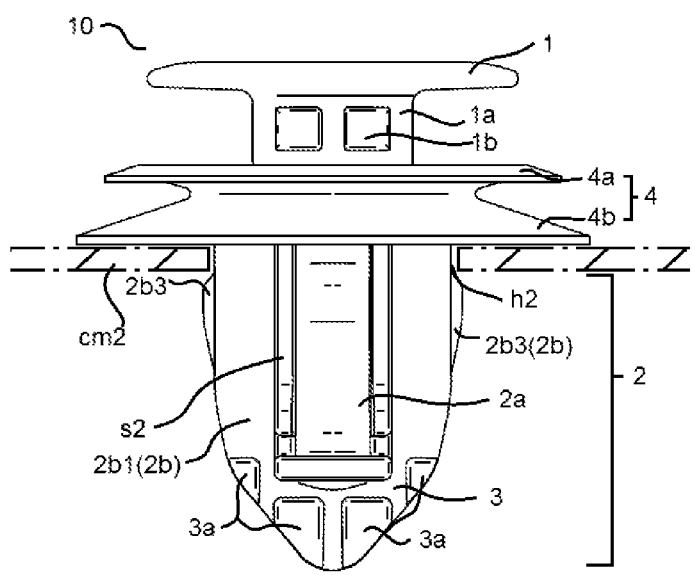
FIG. 9(b) shows a clip of the present invention connected to a connected member at a different position.

After the first enlarged portion 2a1 of the engaging leg 2a and the second enlarged portions 2b3 of the outer portions 2b1 deform and pass through the hole h2 of the connected member cm2, the engaging leg 2a and the outer portions 2b1 deform back to the initial state and sandwich the connected member cm2 between the lower flange portion 4b and the first, second enlarged portions 2a1, 2b3, see FIG. 9(b). Thus, the clip 10 is connected to the connected member cm2 accordingly. Further, the neck portion 1a may be used to attach the connected member cm1 as described in FIG. 9(a) so that the clip is connected to the connected member cm1 and the connected member cm2 simultaneously.

The above description simply illustrates the principle of the invention. Furthermore, a great number of modifications and alterations are possible for those skilled in the art, and the invention not being limited to the heretofore illustrated and described exact configurations and applications, all corresponding modification examples and equivalents are deemed to be within the scope of the invention defined by the attached claims and their equivalents.

For example, in the heretofore described, a description has been given of a case in which the upper flange portion 4a has a diameter greater than that of the base 1 and less than that of the lower flange portion 4b, but the invention not being limited to this, the upper flange portion 4a may have a diameter less than that of the base 1 and greater than that of the lower flange portion 4b.

In the heretofore described, a description has been given of a case in which the base 1 forms a disc-like shape, but the invention not being limited to this, the base 1 may have any shape such as square, rectangle, etc.

Furthermore, in the depicted example, four concave portions 1b are formed on the neck portion 1a; however, not being limited to this, the neck portion 1a may have any number of concave portions 1b formed on the circumferential surface thereof.

What is claimed is:

1. A clip adapted to be connected to a connected member with a hole, comprising: a base, an engaging section extending from the base, and an insertion section fixed to the engaging section at a side opposite to the base and adapted to be inserted into the hole of the connected member, wherein the engaging section comprises: an engaging leg extending from the base, and having elasticity to move inwardly toward a center axis of the engaging section, said engaging leg including a leg portion having a first enlarged portion adapted to engage the hole of the connected member, and a beam extending from the leg portion inwardly toward the center axis and connected to the insertion section, and a pair of engaging members extending from the base along the engaging leg so that the engaging leg is disposed between the pair of engaging members along a circumferential direction of the engaging section, each of the pair of engaging members includes an inner portion extending along the engaging leg away from the center axis, and an outer portion connected at one side to the inner portion to form a closed portion of the engaging section and spaced away from the inner portion to form a first opening at a side opposite to the closed portion, and each of the inner portion and the outer portion form a first space, and the inner portions of the pair of engaging members and an inner surface of the leg portion form a second space, so that when the engaging section is passing through the hole of the connected member, the engaging leg moves toward the center axis, and the outer portions move toward the inner portions respectively, wherein the leg portion of the engaging leg has one end portion connected to the base at a position deviating from the center axis of the engaging section and another end portion connected to the beam, the insertion section includes a projection projecting from the center axis of the engaging section toward the base and fixed to the beam, and the beam extends from the another end portion toward the center axis to connect to the projection of the insertion section wherein the beam has a linear shape extending perpendicular to an insertion direction of the clip.

2. A clip according to claim 1, wherein the outer portion extends circumferentially of the engaging section from the inner portion to form the first space therebetween, and has a second enlarged portion protruding outwardly therefrom.

3. A clip according to claim 1, wherein the beam has a thickness less than that of the first enlarged portion.

4. A clip according to claim 2, wherein each of the closed portions and the engaging leg form a third space communicating with the second space so that the engaging leg moves toward the center axis of the engaging section when the engaging section is passing through the hole of the connected member.

5. A clip according to claim 4, wherein the engaging section is configured to connect to the connected member with the one first enlarged portion of the engaging leg and the two second enlarged portions of the pair of engaging members.

6. A clip according to claim 5, wherein the second space includes a second opening open toward a direction same as the first openings, and the third space includes a third opening open toward a direction opposite to the first and second openings.

7. A clip according to claim 1, wherein a distance between the pair of inner portions extending along the circumferential direction is greater than a distance of the inner surface of the engaging leg extending in the circumferential direction.

8. A clip according to claim 1, wherein each of the closed portions and the engaging leg form a third space communicating with the second space so that the engaging leg moves toward the center axis of the engaging section when the engaging section is passing through the hole of the connected member, and the second space includes a second opening open toward a direction same as the first openings, and the third space includes a third opening open toward a direction opposite to the first and second openings.

* * * * *